United States Patent
Clarisse et al.

(10) Patent No.: US 6,591,290 B1
(45) Date of Patent: Jul. 8, 2003

(54) DISTRIBUTED NETWORK APPLICATION MANAGEMENT SYSTEM

(75) Inventors: Olivier Bernard Henri Clarisse, Des Plaines, IL (US); Bruce A. Westergren, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/379,533

(22) Filed: Aug. 24, 1999

(51) Int. Cl.⁷ .................. G06F 15/16; G06F 15/173
(52) U.S. Cl. ................................. 709/205; 709/223
(58) Field of Search ............................. 709/201, 226, 709/223, 205, 229

(56) References Cited

U.S. PATENT DOCUMENTS

| | | | | |
|---|---|---|---|---|
| 4,849,877 A | * | 7/1989 | Bishop et al. | 364/200 |
| 6,185,601 B1 | * | 2/2001 | Wolff | 709/203 |
| 6,324,578 B1 | * | 11/2001 | Cox et al. | 709/223 |
| 6,334,141 B1 | * | 12/2001 | Varma et al. | 709/205 |
| 6,345,316 B1 | * | 2/2002 | Chessel et al. | 709/330 |
| 6,356,929 B1 | * | 3/2002 | Gall et al. | 709/201 |
| 6,360,263 B1 | * | 3/2002 | Kurtzberg et al. | 709/226 |

* cited by examiner

*Primary Examiner*—Glenton B. Burgess
*Assistant Examiner*—Tod Kupstas (57) ABSTRACT

The distributed network application management system provides distributed data processing services in a data communication network environment. This system dynamically allocates resources to a processing request that is received from a user application device that has limited processing capabilities using application modules that are machine-independent and network independent to thereby process the received request in the network, yet in a manner that appears to be implemented on the user application device. The distributed network application management system is implemented in a network environment using a kernel that represents the network protocol and the effective processor is dynamically created in the network as capacity becomes available. The applications in this system are distributed via the network without meta code being written for the application. There is no socket layer and the various modules necessary to execute a process are dynamically loaded into the execution stream as needed by the network operating system. The operating system organizes the resources and creates the name space to bring the resources to bear on the present computing problem using the mount and bind paradigms.

21 Claims, 6 Drawing Sheets

DISTRIBUTED NETWORK APPLICATION MANAGEMENT SYSTEM

FIELD OF THE INVENTION

This invention relates to the provision of distributed data processing services in a data communication network environment and, in particular, to a system for dynamically allocating resources to a processing request that is received from a user terminal that has limited processing capabilities using application modules that are machine-independent and network independent to thereby process the received request in the network yet in a manner that appears to be implemented on the user terminal device.

Problem

It is a problem in the field of user terminal devices to provide a reasonable level of processing capability at a reasonable cost and complexity. Personal Computers only support the needs of users who are willing to master the operating systems resident on the personal computer and an associated array of commands and procedures. This investment requires a significant amount of time and incentive. To compound this problem, application developers are creating ever more complex applications that require more computer resources and additional user training. The growth in processing capability and programming complexity is substantially at parity with the price of a Personal Computer, with the complete system cost remaining fairly level, but still beyond the reach of many individuals. In addition, the need to provide data storage capacity, battery power, and the associated hardware interface devices results in a user terminal device that is fairly large for the amount of processing capabilities that are provided.

Further compounding this problem is the fact that operating systems are machine-centric in that they are focused on the architecture of the underlying motherboard, hardware system busses and specific device interfaces. The application programming in such an environment builds layers upon the machine-centric operating system, thereby reducing the portability of the code that is developed. The user is therefore committed to a limited universe of applications based upon the basic operating system that is selected and the various application platforms resident thereon.

Another problem is the varying needs of the user do not coincide with the fixed nature of the personal computer hardware and software configuration. The user typically requires a modest amount of processing capability and only occasionally has a need for a significant additional increment of processing capability. However, to accommodate those infrequent needs for additional processing capability, the user must equip the system with the maximum amount of hardware and software resources that can potentially be needed. In addition, the timewise obsolescence of the user's system requires relatively frequent system replacements due to the increasing needs of the application programs that the user loads on the personal computer. It is a difficult problem to gradually increase the capabilities of the personal computer or to provide a temporary increase in capacity for the existing system prior to the financial commitment of a replacement system.

Thus, the existing personal computer and application program architectures are intimately coupled and suffer from a number of limitations that both increase the cost of personal computer systems for the user and limit the flexibility of the users to access various applications. The availability of networks to interconnect multiple processors do not address this problem and suffer from the same limitations.

Solution

The above described problems are solved and a technical advance achieved in the field by the present distributed network application management system, which provides distributed data processing services to a user in a data communication network environment. This system dynamically allocates resources to a processing request that is received from a user application device, which has limited processing capabilities, by using network based application modules that are machine-independent and network independent to thereby process the received request in the network, yet in a manner that appears to be implemented on the user application device. The distributed network application management system is implemented in a network environment using a kernel that contains the network protocol (e.g. STYX, available from Lucent Technologies). The network processing resources are dynamically configured in the network for the needs of the user application device as capacity becomes available. The applications in this system are distributed via the network without meta code being written for the application. There is no socket layer and the various application modules that are necessary to execute a process are dynamically loaded into the execution stream as needed by the network operating system. The network operating system organizes the resources and creates the name space to bring the network resources to bear on the present computing problem using the mount and bind paradigms.

Thus, the user application device can expand its capabilities via use of the network resources, in a manner that is transparent to the user. The applications that are required to serve a user request are resident on the network and either executed in the network or downloaded only to the degree necessary to the user application device for execution. Thus, the distributed network application management system dynamically binds and mounts system resources as needed for the use of the user application device. The applications are architected to be machine independent and modular, so that only the application modules necessary to process the user request are mounted and executed. The application modules can be located anywhere on the network and execute on any processor that is part of the network. Using the file metaphor and name space operations, application modules that export their interfaces as synthetic file structures can be relocated and accessed from anywhere on the network without change. Application modules that export pure functional interfaces (without data sharing) can also be relocated without change by inserting stub modules interconnected via a generic channel server. The channel server provides a file-like interface providing data transport between modules. The execution of the application module process appears to be local, although the actual execution of the application module is distributed and can dynamically change. The local process that executes on the user application device simply imports the necessary interface module and loads a stub to interface with the channel server. The entire application module is not loaded on the local processor of the user application device, since the processing is managed external to the local processor. The interfaces and stubs are never recompiled for relocation.

DETAILED DESCRIPTION

Figure 1:
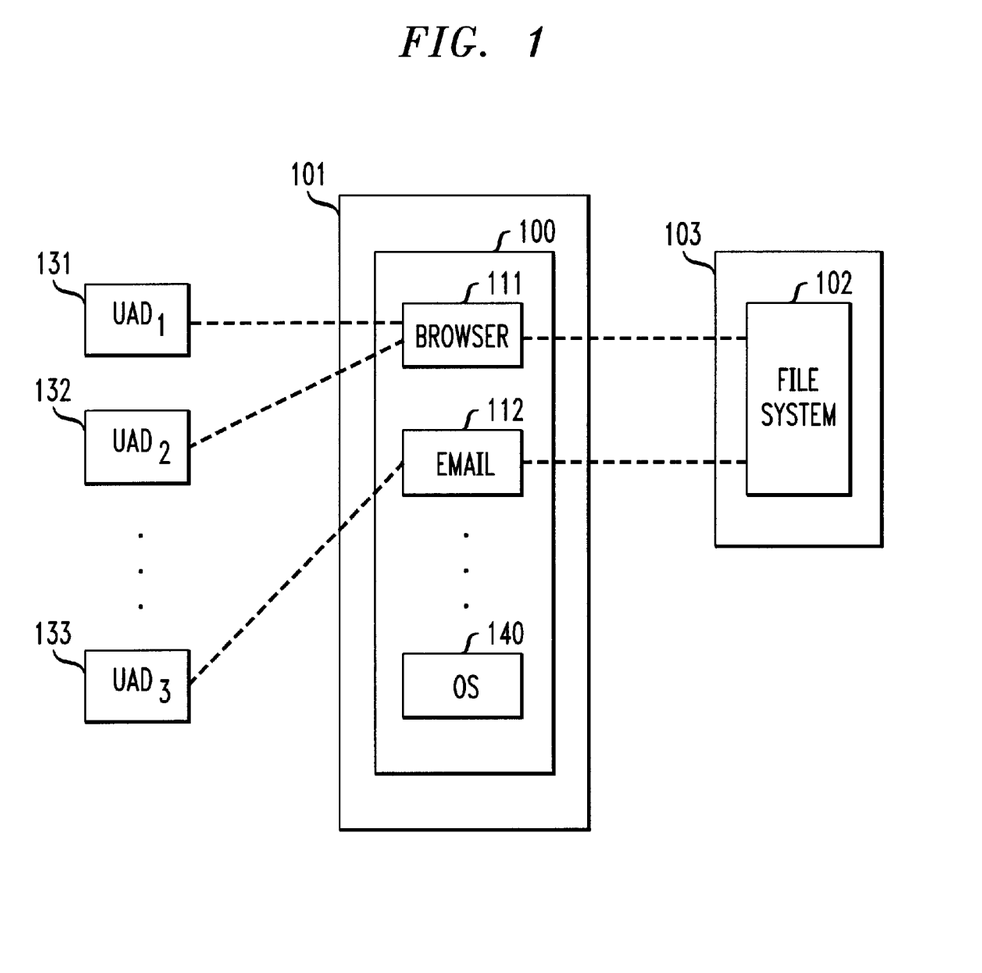
FIG. 1 illustrates in block diagram form the architecture of the present distributed network, application management system and a typical network environment in which it is operational.
Figure 2:
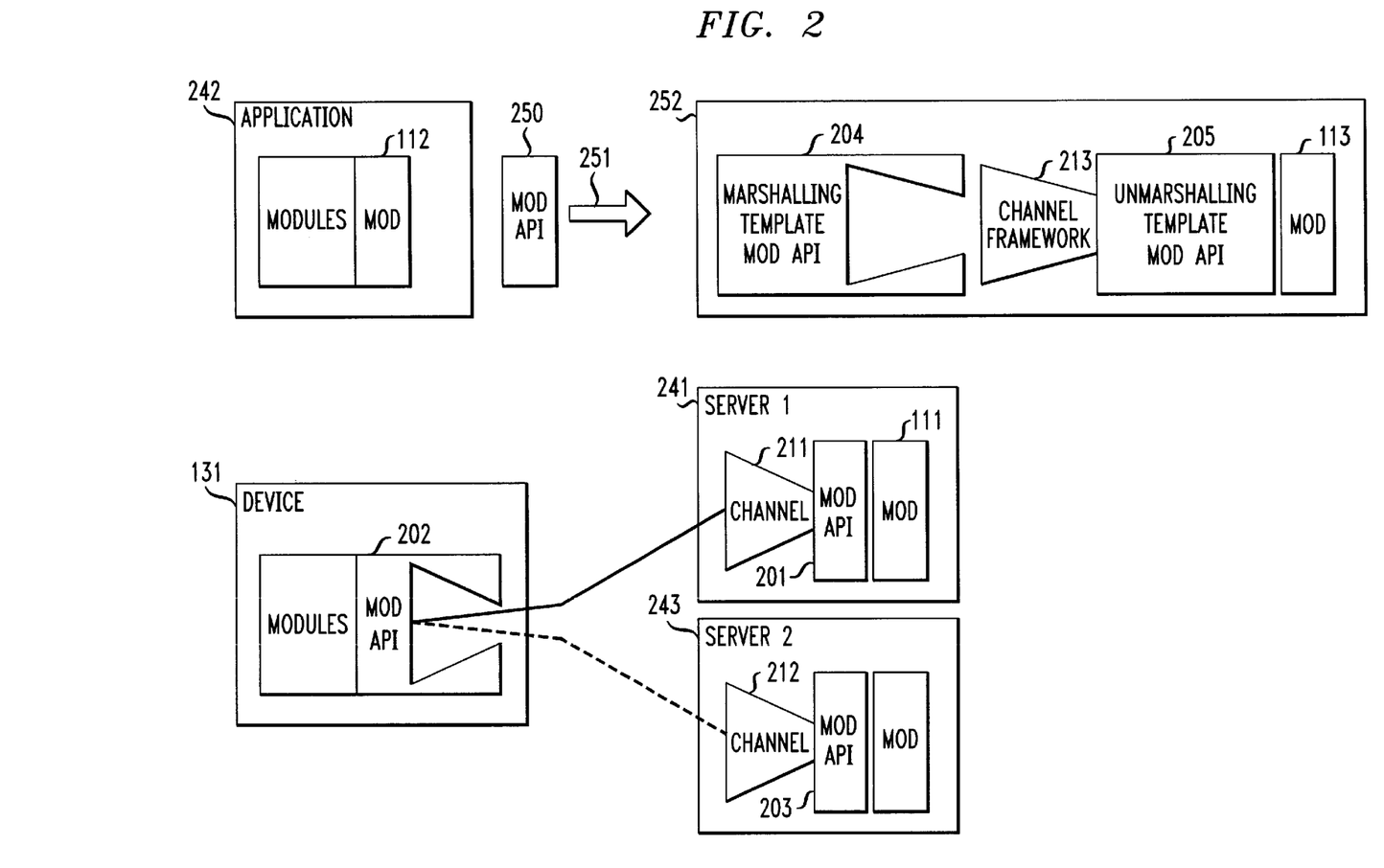
FIG. 2 illustrates in block diagram form the operation of the module interface compiler to produce stub modules conforming with a module interface description, and the corresponding dynamic application distribution process within the present distributed network application management system.

FIG. 1 illustrates in block diagram form the architecture of the present distributed network application management system and a typical network environment in which it is operational while FIG. 2 illustrates in block diagram form the operation of the dynamic application distribution process within the present distributed network application management system. The distributed network application management system 100 is resident on a network server 101 and implements a plurality of applications, such as Browser 111 and E-MAIL 112, for a plurality of user application devices 131–133. The user application devices 131–133 are processor based terminal devices, including but not limited to: personal computers, handheld notepad computers, personal communication devices, cellular telephones, and the like. The network server 101 has access to file system 102 that is resident on one or more data storage devices 103. The file system 102 comprises a plurality of applications as well as user data.

In this distributed network application management system 100, user application devices 131–133, such as a small standalone device having limited processing capabilities, shift the application processing and storage functions to the network server 101. This distributed network application management system 100 implements the distributed processing capability by using application modules 111, 112 that are machine-independent and network independent to thereby process the received request in the network, yet in a manner that appears to be implemented on the user application device (such as user application device 131). The portable distribution of applications, and the relocation of application modules is achieved without modifying the original application source code and without requiring application code to be recompiled to enable relocation. The present distributed network application management system 100 loads only a limited number of application modules on a particular user application device 131, with the application software being downloaded incrementally from the network server 101 on an as needed basis. Therefore, the burden of providing complex and costly applications is shifted to the common point of the network server 101, which spreads the cost of the applications and the processing capacity of the system among many users while also maintaining a single point of concurrency. The processing power of the network server 101 can be optimized to thereby enable the user application device 131 to be implemented using a much slower processor without sacrificing performance, as seen by the customer at the user application device 131, assuming sufficient communication bandwidth is available.

In the distributed network application management system 100, application modules 111 112 are dynamically loaded and the underlying architecture is a set of loadable interactive application modules 111, 112. The application modules 111, 112 can be located anywhere on the network and execute on any processor (servers 241–243) that is part of the network. As shown in FIG. 2, using the file metaphor and a name server, stub modules 201, 203, 205 can be added to each application module 211–213 and the stub modules 201, 203, 205 interconnected via a generic channel server 211–213.

Module Interface Compiler

The module interface compiler 251 reads as input the module application programming interface (MOD API) 250 and produces the software modules required for module API distribution 252. Module application programming interface 250 is the source description of the interface for the application module 112 to be distributed. If application module 112 already provides a channel API in application 242, the module interface compiler 251produces no additional software module. If the application module 112 provides a functional interface, the module interface compiler 251 produces modules 204 and 213–205. Module 204 implements an interface equivalent to the module application programming interface 250 and implements the interface conversion from described data-objects to the file-like communication channel interface. Module 213 implements the channel server framework and module 205 translates the data received over this file-like communication channel back into data-objects that are copies of the original dat-objects presented at the interface module 204. This enables invocation of application module 113, a copy of application module 112, directly from module 205. The behavior of application module 112 is then equivalent to that of interface module 204 connected to modules 213–205–113.

The channel servers 211–213 define the interfaces that are required for the application modules 201, 203, 205 and then manage the intra-module communication. The execution of the application module process appears to be local, although the actual execution of the application module 201, 203, 205 is distributed and can dynamically change. The local process that executes on the user application device 131 simply imports the necessary interface module and loads a stub 202 to interface with the channel servers 211, 212. The entire application module 111, 112 is not loaded on the local processor of the user application device 131, since the processing is managed external to the local processor. The interfaces and stubs are never recompiled for relocation.

The present distributed network application management system 100 is illustrated as implemented using the Inferno™ network operating system 140 that is available at Lucent Technologies. The Inferno network operating system 140 provides several mechanisms that enable the application developer to create applications using components that are distributed across a network and multiple computing platforms which are interconnected by the network. The Inferno network operating system 140 supports a uniform file interface to all resources (data files, devices and programs) and a powerful set of name space operations for creating the view of those resources that are required by an application. These capabilities support rapid development and delivery of dynamically distributed applications. The distributed network application management system enables the delivery of network-centric applications with the following characteristics:

Fault tolerance for application recovery

Transparent load balancing of server processes

Multi-server scalability

Multi-client process sharing

Server process location transparency.

Some inherent characteristics of the Inferno network operating system that are beneficial to the implementation of the present distributed network application management system include, but are not limited to:

Built-in Security—Inferno provides security capabilities between Inferno based machines, including mutual authentication, message encryption, message digesting and digital signature, Portability—supports cross-platform and cross network development. The Inferno STXY protocol is an abstracted communication protocol that supports development, deployment and operation of network independent applications. The Inferno DIS virtual machine is an abstracted computation machine that supports the efficient execution of machine-independent operations.

Inferno name space—enables a computer system to have authorized ubiquitous direct access to required network resources. Resources are represented as files (data files, devices, processes, servers, networks, and the like). An Inferno invoked application can access a variety of resources without regard to their instantiation. The location, configuration and network protocol that supports the resources can vary without requiring changes to the application code.

The present distributed network application management system 100 effects the dynamic distribution of processing resources by the use of the Inferno name space construction operations of: mount and bind. In operation, an executable segment of an application, termed an application module 201, is selected for separation from the original application 240, which application module 201 does not share data with other application modules 202, 203. The selected application module 201 is then distributed between a user application device 131 and a network server 241 by executing the following steps:

1. Starting a server process to provide a channel interface 211 that preserves the application module interface 221 and which enables the reuse of the original application module 201.

2. Mounting the server name space on the user application device 131 (client) and binding the server channel 211 to the appropriate location in the application module 201.

3. Shadowing the original application module 201 on the user application device 131 using a client template that preserves the original application module 201 and communicates via the local channel 211.

In this manner, the user application device 131 can access only the needed segments of an application 242 by simply downloading the essential application modules 201 that are necessary to implement the task that has been requested by a customer who is operating the user application device 131. In addition, the user application device 131 can initiate the execution of the application module 201 on the network server 221 or enable the present distributed network application management system 100 to allocate server resources to execute the application module 201 on another available network server resource 222.

Name Space Distribution

Figure 3:
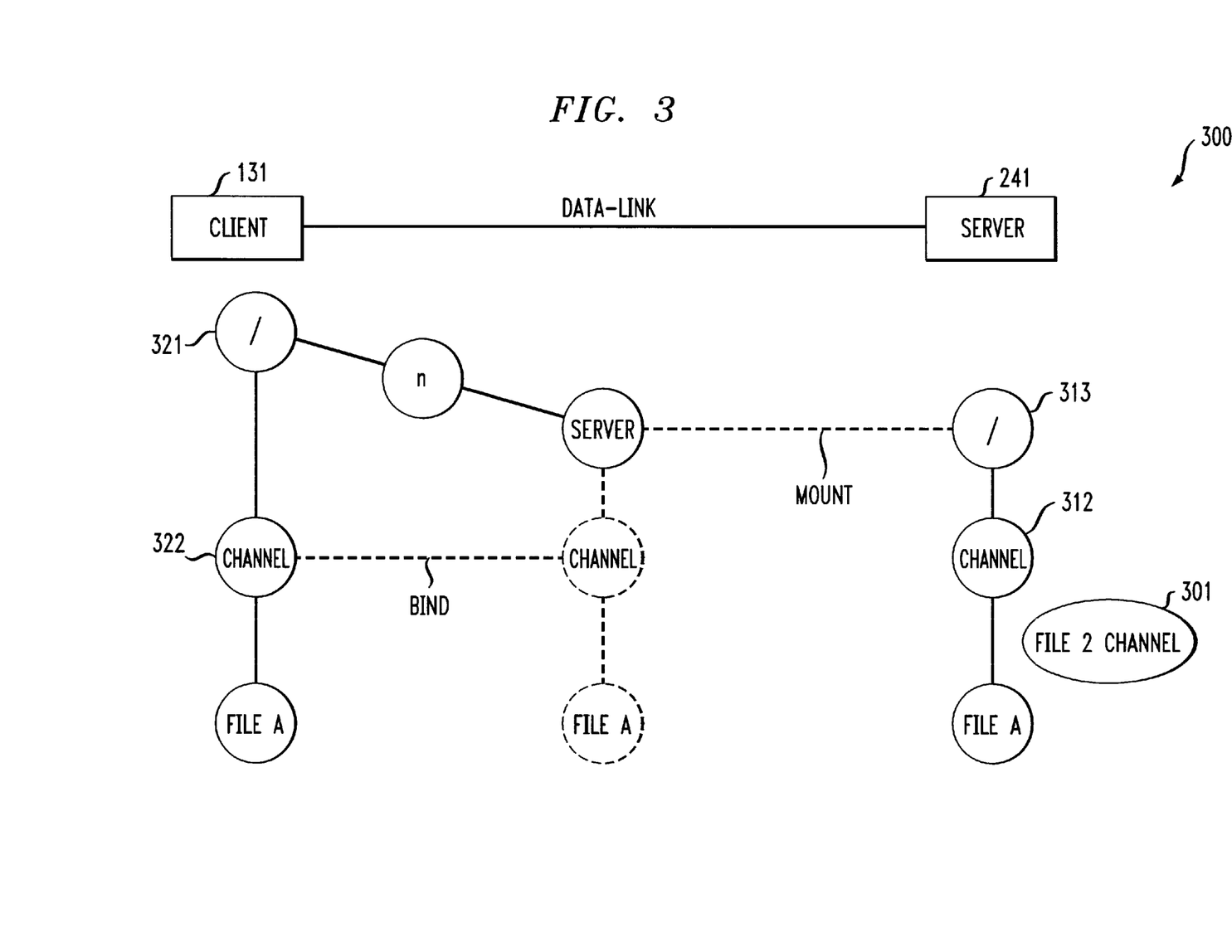
FIG. 3 illustrates the distribution of file name space within the present distributed network application management system.

FIG. 3 illustrates the distribution of file name space within the present distributed network application management system 100. A simple case of server process distribution can easily be implemented by using the file2chan process 301 that exists in the Inferno network operating system 300. The distributed network application management system 100 creates a channel file 312 under the /chan directory 313 termed "FileA" using the file2chan process 301. A listing of the /chan directory 313 on the: network server 241 now shows the file: /chan/FileA. A client process 321 executing on a user application device 131 and located on the same system network can open this file FileA and perform read and write calls to communicate with the server process 311. Since the FileA channel file is just like any other file, it can be manipulated using the name space operators. To execute the same client process, 321 on a different machine than the network server 241, the mount operation is executed on the client process 321 executing on the user application device 131 to present the server name space to the client 131 as if it were local, and bind to map the server /chan directory 313 to the client /chan directory 322. Now when the client process 321 runs, it performs the same operations as before, except that it transparently accesses the server process 311 on a different machine. Client 321 and server 311 processes can therefore be distributed across any machine and any network.

The bind operation provides shadowing and does not remove the existing file, therefore binding can occur over the channel file during an existing read/write sequence and not interfere with the present data transfer. Thus, as a selected resource becomes too busy, the client name server can dynamically reconfigure its name space to point to the server that has a lighter load. The physical location of the server processes is not relevant in this architecture and system hardware configurations can change without impacting the operation of the overall system. In order to effect this transparency, the applications must be independent (no memory sharing or call dependencies) to allow the application modules to be moved to a separate process space.

Channel Framework

The channel framework must be running for each network server module exporting a pure functional interface that needs to be accessed remotely. The channel framework is not required to export module interfaces that are already defined as synthetic file structures. The channel framework provides the implementation of the channel file (channel server) and the acceptance of the requests and sending of replies to the client processes. The channel framework is capable of handling multiple requests from multiple clients, and is shared by all clients accessing the same channel resource from the same server. The channel framework takes two types of arguments: server template processes to be invoked upon receiving requests from clients; channel resources used for client and server communications and that activate the respective server template processes. Channel resources are simple channel files or directories structures of channel files. The server side template module implements a standard interface that is invoked by the channel framework. The channel framework provides a generic communication mechanism to export pure functional interface descriptions as channel resources. For example, if a module API exports N functions, the client side template converts (marshals) each of the N types of function calls into a message that embodies the function signature and the contents of its arguments, the message is then written on the corresponding channel file and communicated via the channel framework to the server (transparently via STYX) where the server side templates decodes (unmarshals) the message and invokes the corresponding function passing it the decoded (unmarshaled) arguments. On the server side, the function actually executed is provided by a copy of the original module API (unchanged) loaded and initialized by the server side template module which in turn loads and executes the target module. A similar execution process is used to return the reply value(s) from the execution of the server side function to the client side template. The client side template module implements the same call return interface used on the target side template module. The client side template module is loaded by the main client application in place of the real target. While the client side and server side templates are dedicated code generated to implement each side of the relocated module (pure functional) interface, the channel framework code is generic shared by all client/server templates and implements a common processing and returning interface achieved by writing to and reading messages from a channel resource.

The client side template module is loaded by the main client application in place of the real target. The client side template module opens the channel for read/write access, marshals the request, writes the request, reads the reply, unmarshals the data to the application specific format and returns the reply.

If the application module is dynamically loaded on demand by the original application and the communication interface between the application module and the remaining application modules is stateless, then the three above-noted operations required for distribution can be executed while the application module is executing. Dynamic distribution of the live application module is possible in this case. The distribution of the application module does not require any modification to the original application.

The server executes the target module process as well as the server template process that invokes it and preserves the module application interface. The channel framework executes on the server with the server template module and channel file name as its two arguments. The name space operations of mount and bind enable the system to determine when the distribution is to occur and where the distributed processes are located. If the client application loads the target module dynamically, the client template can be placed in the load location expected by the original application. This is done via a bind operation to shadow the real target module. The template resides on the client or it can be obtained transparently from the server via name space configuration. Typically, the server is mounted to some mount point in the client and the directory is bound where the client template resides to shadow the local module.

This architecture enables the hot spare replacement:
1. A group of identical server processes is distributed on different machines.
2. A name space manager on the client rebinds over the existing channel directory. The client application accesses a different server process each time.
3. Switching server is transparent to the client application.

Dynamic Allocation of Resources

The dynamic allocation of resources is performed on the client by the name space manager and is mediated by the connection server. A request to a connection server for an application service returns a mount and bind sequence invoked by tho client to update the application name space. The client is then able to proceed, unmodified, requesting the service in the updated name space. Extending the principles of DNS servers for the Internet, connection servers provide a hierarchy of systems performing the translation between logical services and physical service information (mapping from logical service request to physical addresses of servers providing such services). The connection service is the clearing house for remote servers service offerings. These offerings are maintained in each connection server as a hierarchy of resource files. As a remote server removes its offer the hierarchy is changed, and the server resources are disabled from the connection server.

As the server comes alive, it authenticates with its local signer, as the authenticity of the server is verified, the corresponding connection server (usually collocated with the signer) caches a representation of the channel resources provided by the server. When a client requests a specific channel, the connection server matches the channel path name and retrieves a list of candidate servers providing such channels. If the connection server fails to identify local servers providing the requested service (offering a matching channel path name), it forwards the requests to the next connection server in the hierarchy.

The client name space manager uses the list of servers identified by the connection server to provide reliable services for each required channel resource. As a channel resource performance degrades, or as a channel resource becomes unavailable, a replacement channel resource is obtained from the next server in the list returned by the connection server.

Distributed Browser

Figure 4A:
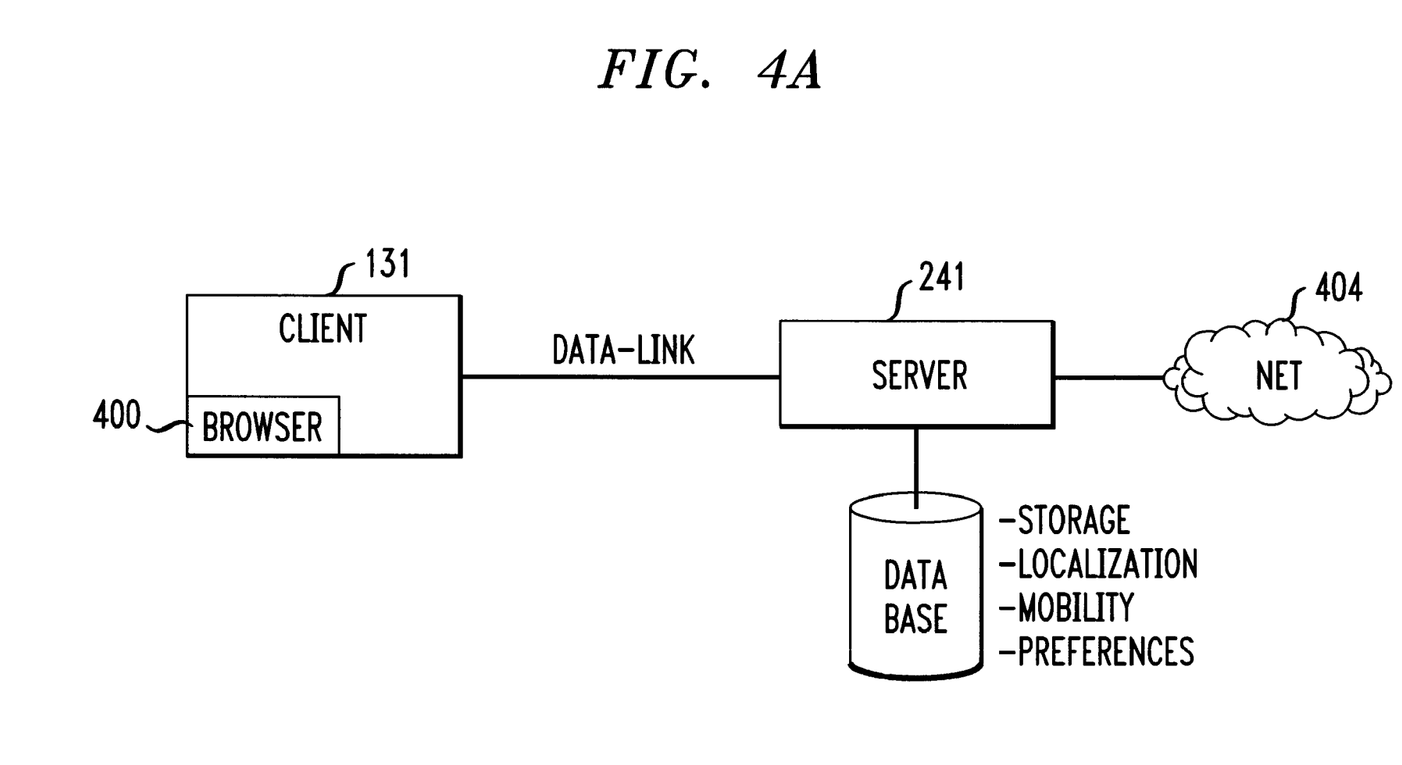
FIGS. 4A and 4B illustrate in block diagram form the example of an Internet Browser distribution within the present distributed network application management system.
Figure 4B:
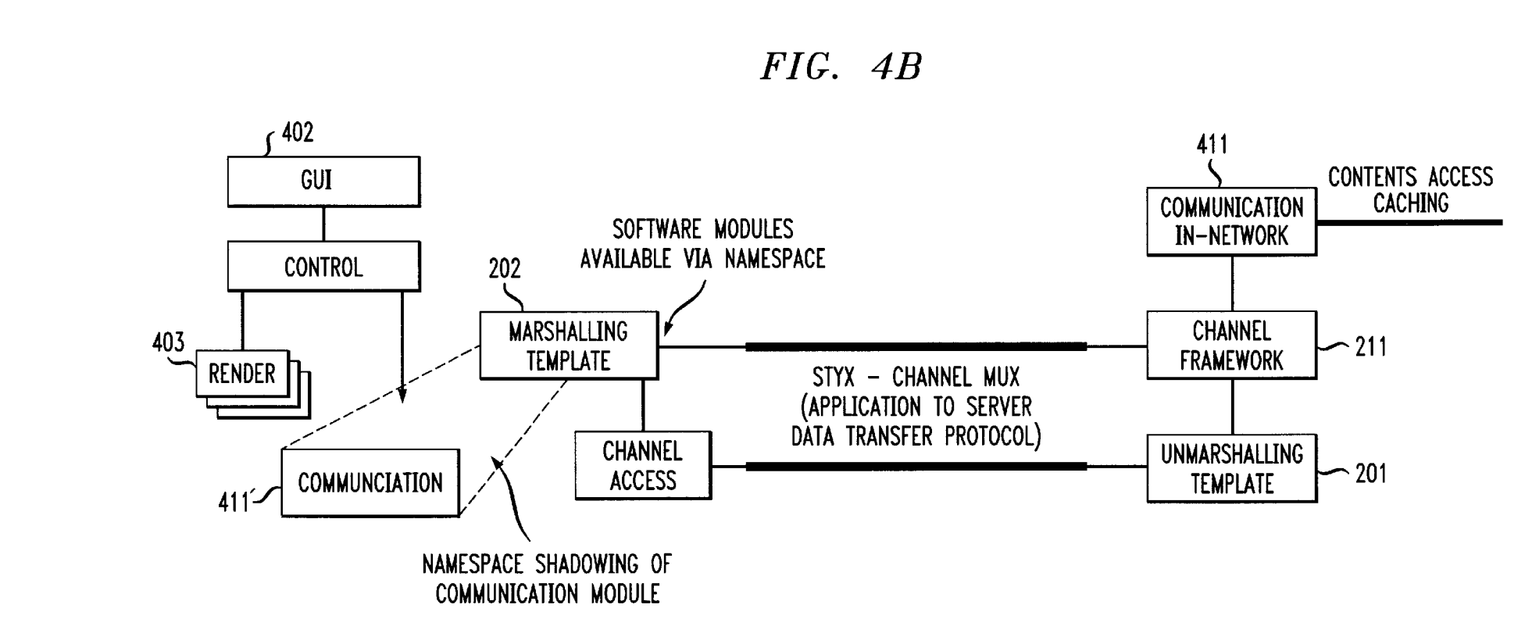

FIGS. 4A and 4B illustrate in block diagram form the example of an Internet Browser distribution within the present distributed network application management system 100. The browser application module 410 is designed to execute on a small standalone device, the user application device 131, and the communication module 411 that is necessary to execute a browser function may not be resident on the user application device 131. For example, a thin user application device is a minimal processing capability device and does not have the power to launch its own applications and must be connected to the servers of the distributed network application management system to effect the desired functionality. A medium capacity user application device can be used in a simple stand alone mode but to attain significant processing and feature performance it is necessary to connect to the network servers of the distributed network application management system.

The browser application module 400 illustrated in FIG. 4 uses a function call interface to process communication requests. The communication module 401 separation from the browser application module 400 is possible without code change since the communication module 401 does not depend on any other browser modules. The shadowing technique is used to enable channel communications without changing the browser code. It also makes sense to distribute the communication module 401 to the network server 241 because it executes in parallel with the user interface 402 and rendering 403 functions; communication may be more efficient on the network server side; and caching space is available on the network server side. Thus, the user application device 131 sends keystrokes and pointer locations to a dedicated network server 221 in the distributed network application management system 100. Browser software 404 on the network server 221 processes this information and generates HTTP requests toward the Internet 404. The Internet communications proceed as with existing browsers, although the processing of the browser function 400 is distributed between the user application device 131 and the network server 221. The effective user interface 402 that is presented to the customer at the user application device 131 is equivalent to the personal computer based Web browser applications presently in use, while the capabilities of the user application device 131 can be significantly reduced in comparison with the existing personal computer platform.

Network Communications Application

Figure 5:
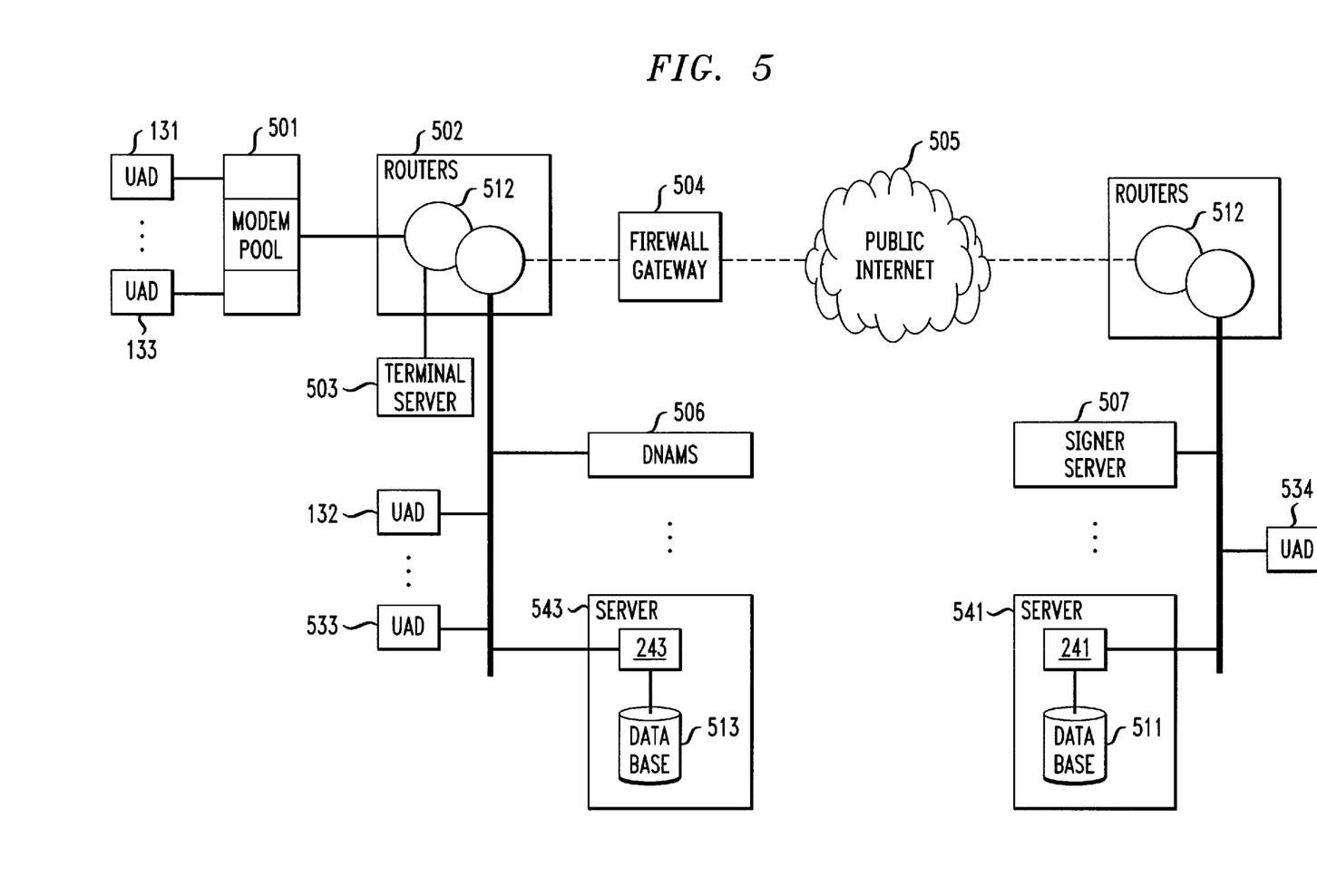
FIG. 5 illustrates in block diagram form the use of the present distributed network application management system in a communications application, such as interfacing with the Internet.

FIG. 5 illustrates in block diagram form the use of the present distributed network application management system 100 in a communications application, such as interfacing with the Internet 505.

The present distributed network application management system provides applications for user application devices and Managed Network Services. The user application device application comprises:

Web browsing and personalized home page;

E-Mail viewer;

Internet telephony

Managed Network Services comprise:

User personalization;

User auto subscription;

Network management.

In this environment,

1. Automatic software update—software updates are transparently available from the distributed network application management server for the browser and Email functions.
2. Enhanced Performance—distributed network application management architecture relies on the Inferno name space and network operating system to make network resources transparently available to user applications.
3. Dynamic Updates—access to new or enhanced features including new attachment formats for email, new plug-ins for the Web browser are available to the user applications as they arrive on the distributed network application management server.
4. Personalization—the distributed network application management server provides end user personalized home page, preferences and information delivery.
5. Mobility—the distributed network application management server provides each end user with a uniform (personalized) environment independent of the physical location of the user log-in.
6. Personal Storage—the distributed network application management server provides limited user data storage consistently accessible from anywhere to store Email messages, Web browser bookmarks, telephony address book in the network file system.

The user of UAD 131 is provided with a Graphical User Interface displaying information updates from applications accessing (for example) the Internet from servers 243. This is accomplished by mounting the display, keyboard and mouse from UAD 131 in an application name space created on distributed network application management server (DNAMS) 506. The user application processing is performed by the distributed network application management server 506 as input and display output are remoted to the device 131; the application is unaware of the physical location of the input and output devices, in its name space the devices appear as if local.

The choice of initial configuration mode (application remote or local) is achieved after the user of UAD 131 logs into the system, the signer server 507 authenticates the user and assigns the device to the local distributed network application management server 506 in a setup script sent from signer server 507 to device 131. The setup script identifies the processing, memory and data transmission capabilities of device 131 and decides on an initial processing allocation residing entirely on the server, partly on the device and partly on the server, or entirely on the device.

The user of UAD 133 is using an application running partly on the device and partly on the network. The current user of device 133 is homed on the other side of the world, the user normally accesses device 534 and uses for personalization home server 541. A local server, presence server 243 provides initial network service to device 133. A name space is created on the device to use part of the application provided by server 243. The rest of the application executes on device 133 while the user personalization information is brought locally into the name space from home server 541. Home server 541 provides stored information with the user preferences and customizations from store 511.

Both UAD 131 and 133 access Internet 505 via a telephony network to an Internet service provider (ISP) network, including dial-up connection from 131 to modem pool 501, routing through router 512, login into the local ISP 502 via terminal server 503 and access to the ISP local network via routers 512 in ISP 502 including the servers 506 and 543 and access to the Internet via gateway firewall 504, including remote connectivity to signer server 507 and home server 541 via routers 512.

Device 132 has direct access to a local ISP network requiring no initial dial-up, abstracting connectivity via to a local Internet provider via cable or fiber access. The user of UAD 132 has applications running entirely on the device and personalization information brought locally into the application name space from home server 541, and accesses from store device 511.

Devices 131, 132, 133 implement three examples from a quasi-continuum of applications and resources distribution configurations enabled by DNAMS. Mobility of personalization and customization is provided as a user changes location even temporarily and accesses devices 131, 132, or 133. As the user logs into one of the devices, the signer authenticates the user and identifies the user home server 541. The user home server is brought into the device name space to providing the user's expected environment created dynamically from available local and remote resources.

As a user migrates from device 131 to 132, having established a persistent communication path from device 131, an intelligent client provides the ability to re-establish a similar communication path from device 132. For example an established voice over IP connection follows the user migrating from device 131 to 132 and back. The call status information is stored as persistent user data on the home server.

Persistent user data is mobile since such user data is provided locally from the user home server (appears in the local application name space). Such user data is defined, used or changed by the application as if it were local to the device. A persistent communication path is also automatically re-established by the client in case of failure, as if the user migrated from device 131 to itself.

User data is cached by the device application enabling the client side to recover, for example, connections lost due to transient network failures. Additional redundancy is provided as persistent user data stored in the user home server is also stored on the presence server (or an available fall back server). Such persistent user data is used to recover from a client failure, enabling the user to log into a replacement device, as in the case of user migration from device 131 to 132. DNAMS server 506 enables easy access to new data services arid the Internet from user application devices. Service features integrating Internet telephony and data services are enabled from a variety of devices using a telephone line, PSTN as well as cable or fiber access to access the Internet.

Summary

The system dynamically allocates resources to a processing request that is received from a user application device, which has limited processing capabilities, by using network based application modules that are machine-independent and network independent to thereby process the received request in the network, yet in a manner that appears to be implemented on the user application device. The distributed network application management system is implemented in a network environment using a kernel that contains the network protocol. The network processing resources are dynamically configured in the network for the needs of the user application device as capacity becomes available.

What is claimed:

1. A distributed network application management system, operational in a communication network that interconnects a plurality of user application devices with a plurality of servers, for executing application processes, each of which comprise a plurality of application modules, on a distributed basis among said plurality of servers, comprising:

means, responsive to a user activating an application process on a one of said user application devices where said activated application process is not resident on said one user application device, for transmitting control data to a selected one of said plurality of servers indicating a request for initiation of said activated application process by said user;

means for establishing a channel communication process to interconnect said one user application with said selected one of said plurality of servers;

means for transmitting at least one of said plurality of application modules of said activated application process to said one user application device for execution thereon absent recompilation of said at least one application module; and means for executing other modules of said plurality of application modules of said activated application process on at least one of said plurality of servers cooperation with said one user application device.

2. The distributed network application management system of claim 1 wherein said means for establishing comprises:

means for implementing a channel framework for accepting said request for initiation of said activated application process and sending of replies to said one user application.

3. The distributed network application management system of claim 2 wherein said means for implementing comprises:

server template process means invoked upon receiving said request for initiation of said activated application process from said one user application; and channel resource means used for communications with said one user application device and said selected one of said plurality of servers.

4. The distributed network application management system of claim 3 wherein said server template process means comprises:

means for decoding said request for initiation of said activated application process;

means for invoking a function corresponding to said request for initiation of said activated application process; and means for passing said invoked function decoded arguments contained in said request for initiation of said activated application process.

5. The distributed network application management system of claim 2 wherein said means for implementing comprises a generic communication mechanism to export pure functional interface descriptions as channel resources.

6. The distributed network application management system of claim 1 wherein said selected one of said plurality of servers comprises:

name space manager means for dynamic allocation of resources.

7. The distributed network application management system of claim 6 wherein said selected one of said plurality of servers comprises:

means for returning a mount and bind sequence invoked by said one user application device to update the application name space.

8. The distributed network application management system of claim 1 wherein said selected one of said plurality of servers comprises:

means for authenticating said selected one of said plurality of servers with a signing server; and means, responsive to authenticity of said selected one of said plurality of servers being verified, for caching a representation of the channel resources provided by said selected one of said plurality of servers.

9. A method for executing application processes in a communication network that interconnects a plurality of user application devices with a plurality of servers, each of which comprise a plurality of application modules, on a distributed basis among said plurality of servers, comprising the steps of:

transmitting, in response to a user activating an application process on a one of said user application devices where said activated application process is not resident on said one user application device, control data to a selected one of said plurality of servers indicating a request for initiation of said activated application process by said user;

establishing a channel communication process to interconnect said one user application with said selected one of said plurality of servers;

transmitting at least one of said plurality of application modules of said activated application process to said one user application device for execution thereon absent recompilation of said at least one application module; and executing other modules of said plurality of application modules of said activated application process on at least one of said plurality of servers cooperation with said one user application device.

10. The method of claim 9 wherein said step of establishing comprises:

implementing a channel framework for accepting said request for initiation of said activated application process and sending of replies to said one user application.

11. The method of claim 10 wherein said step of implementing comprises:

invoking a server template process upon receiving said request for initiation of said activated application process from said one user application; and activating a channel resource for communications with said one user application device and said selected one of said plurality of servers.

12. The method of claim 11 wherein said step of invoking comprises:

decoding said request for initiation of said activated application process;

invoking a function corresponding to said request for initiation of said activated application process; and passing said invoked function decoded arguments contained in said request for initiation of said activated application process.

13. The method of claim 10 wherein said step of implementing uses a generic communication mechanism to export pure functional interface descriptions as channel resources.

14. The method of claim 9 further comprising:

dynamically allocating resources using a name space manager.

15. The method of claim 14 further comprising:

returning a mount and bind sequence invoked by said one user application device to update the application name space.

16. The method of claim 9 further comprising:

authenticating said selected one of said plurality of servers with a signing server; and caching, in response to authenticity of said selected one of said plurality of servers being verified, a representation of the channel resources provided by said selected one of said plurality of servers.

17. A distributed network application management system, operational in a communication network that interconnects a plurality of user application devices with a plurality of servers, for executing application processes, each of which comprise a plurality of application modules, on a distributed basis among said plurality of servers, comprising:

request generation means, responsive to a user activating an application process on a one of said user application devices where said activated application process is not resident on said one user application device, for transmitting control data to a selected one of said plurality of servers indicating a request for initiation of said activated application process by said user;

communication means for establishing a channel communication process to interconnect said one user application with a first of said plurality of servers;

module distribution means for transmitting at least one of said plurality of application modules of said activated application process to a second of said plurality of servers for execution thereon absent recompilation of said at least one application module.

18. The distributed network application management system of claim 17 wherein said module distribution means comprises:

name space manager means for dynamic allocation of resources.

19. The distributed network application management system of claim 18 wherein said module distribution means further comprises:

means for returning a mount and bind sequence invoked by said second server to update the application name space.

20. The distributed network application management system of claim 18 wherein said name space manager means comprises:

reallocation means for dynamic reallocation of said at least one application module to another one of said plurality of servers during processing of said request for initiation of said activated application process.

21. The distributed network application management system of claim 17 wherein said module distribution means comprises:

means for transmitting said at least one of said plurality of application modules to said second of said plurality of servers for execution thereon absent recompilation of said at least one application module.

* * * * *